(12) United States Patent
Jagannathan et al.

(10) Patent No.: US 10,856,000 B2
(45) Date of Patent: Dec. 1, 2020

(54) SAVING MINIMUM MACROBLOCK DATA FOR SUBSEQUENT ENCODING OF OTHER MACROBLOCKS

(71) Applicant: TEXAS INSTRUMENTS INCORPORATED, Dallas, TX (US)

(72) Inventors: Shyam Jagannathan, Bangalore (IN); Naveen Srinivasamurthy, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/108,422

(22) Filed: Aug. 22, 2018

(65) Prior Publication Data
US 2018/0359479 A1 Dec. 13, 2018

Related U.S. Application Data

(63) Continuation of application No. 13/533,075, filed on Jun. 26, 2012, now Pat. No. 10,063,871.

(30) Foreign Application Priority Data

Sep. 11, 2011 (IN) .......................... 3846/CHE/2011

(51) Int. Cl.
*H04N 19/433* (2014.01)
*H04N 19/43* (2014.01)

(52) U.S. Cl.
CPC .......... *H04N 19/433* (2014.11); *H04N 19/43* (2014.11)

(58) Field of Classification Search
CPC .............................. H04N 19/433; H04N 19/43
See application file for complete search history.

(56) References Cited

U.S. PATENT DOCUMENTS

| 8,718,140 B1* | 5/2014 | Cai ...................... H04N 19/176 375/240.16 |
| 2003/0174252 A1* | 9/2003 | Bellas .................... H04N 5/145 348/699 |
| 2003/0228063 A1 | 12/2003 | Nakayama et al. |
| 2005/0232358 A1* | 10/2005 | Nicolas .................. H04N 5/144 375/240.16 |
| 2006/0133506 A1* | 6/2006 | Dang .................... H04N 19/43 375/240.17 |
| 2006/0159350 A1* | 7/2006 | Watanabe ............ H04N 19/176 382/232 |

(Continued)

OTHER PUBLICATIONS

Subset (1992) in C Morris (Ed), Academic Press Dictionary of Science and Technology, Oxford, UK: Elsevier Science & Technology, p. 1 of 1.

*Primary Examiner* — Tracy Y. Li
(74) *Attorney, Agent, or Firm* — Ebby Abraham; Charles A. Brill; Frank D. Cimino

(57) ABSTRACT

A video encoder including a first buffer containing a plurality of data values defining a macroblock of pixels of a video frame. The video encoder also includes a second buffer and an entropy encoder coupled to the first and second buffers and configured to encode a macroblock based on another macroblock. The entropy encoder identifies a subset of the data values from the first buffer defining a given macroblock and copies the identified subset to the second buffer, the subset of data values being just those data values used by the entropy encoder when subsequently encoding another macroblock.

19 Claims, 3 Drawing Sheets

(56) References Cited

U.S. PATENT DOCUMENTS

| | | |
|---|---|---|
| 2006/0236000 A1 | 10/2006 | Falkowski et al. |
| 2008/0285873 A1 | 11/2008 | Ando |
| 2009/0003446 A1* | 1/2009 | Wu .................. H04N 19/176 |
| | | 375/240.16 |
| 2009/0063865 A1 | 3/2009 | Berenbaum et al. |
| 2009/0172364 A1 | 7/2009 | Sprangle et al. |
| 2009/0274209 A1 | 11/2009 | Garg et al. |
| 2010/0284464 A1 | 11/2010 | Nagori et al. |
| 2011/0317762 A1 | 12/2011 | Sankaran |
| 2012/0170667 A1 | 7/2012 | Girardeau et al. |
| 2013/0027230 A1* | 1/2013 | Marpe ................. H03M 7/4006 |
| | | 341/107 |
| 2016/0309179 A1* | 10/2016 | Schwarz ................ H04N 19/50 |

* cited by examiner

SAVING MINIMUM MACROBLOCK DATA FOR SUBSEQUENT ENCODING OF OTHER MACROBLOCKS

CROSS-REFERENCE TO RELATED APPLICATION

The present application is a continuation of and claims priority to U.S. patent application Ser. No. 13/533,075, filed on Jun. 26, 2012 and now issued U.S. Pat. No. 10,063,871, which claims priority to India Provisional Patent Application No. 3846/CHE/2011, filed on Sep. 11, 2011, which are hereby incorporated by reference.

BACKGROUND

High definition (HD) video comprises numerous macroblocks per frame. For 1080p video, there are 8160 16×16 pixel macroblocks. Thus 8160 macroblocks must be decoded 30 times per second, thereby imposing a significant performance burden on the encoder. Video encoders often are constructed in a pipeline fashion to improve throughput, but additional performance improvements may be desirable.

SUMMARY

An illustrative embodiment is directed to a video encoder including a first buffer containing a plurality of data values defining a macroblock of pixels of a video frame. The video encoder also includes a second buffer and an entropy encoder coupled to the first and second buffers and configured to encode a macroblock based on another macroblock. The entropy encoder identifies a subset of the data values from the first buffer defining a given macroblock and copies the identified subset to the second buffer, the subset of data values being just those data values used by the entropy encoder when subsequently encoding another macroblock.

Another embodiment is directed to a video apparatus including a video encoder including a first buffer containing a plurality of data values defining a macroblock of pixels of a video frame. The video encoder also includes a second buffer and an entropy encoder coupled to the first and second buffers. The entropy encoder is configured to encode a macroblock based on another macroblock. The entropy encoder identifies a subset of the data values from the first buffer defining a given macroblock and copies the identified subset to the second buffer, the subset of data values being just those data values used by the entropy encoder when subsequently encoding another macroblock. The video apparatus also includes a direct memory access (DMA) engine coupled to the video encoder to transfer the identified subset from the second buffer to memory external to the video encoder.

Yet another embodiment is directed to a method usable in a video encoder. The method includes reading uncompressed non-contiguous portions from a data set in a first storage, the data set describing a first macroblock, and the portions being some but not all of the data set. The method further includes writing the portions to contiguous locations in a second storage to form compressed macroblock information. The method also includes writing the compressed macroblock information from the second storage to a third storage and encoding a second macroblock based on the compressed macroblock information from the third storage.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

The term "macroblock" is used herein to represent a group of pixels to be rendered on a display. A macroblock may be a 16×16 group of pixels, but can be a different size and need not be square in other embodiments. A frame of video data is represented by multiple macroblocks.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
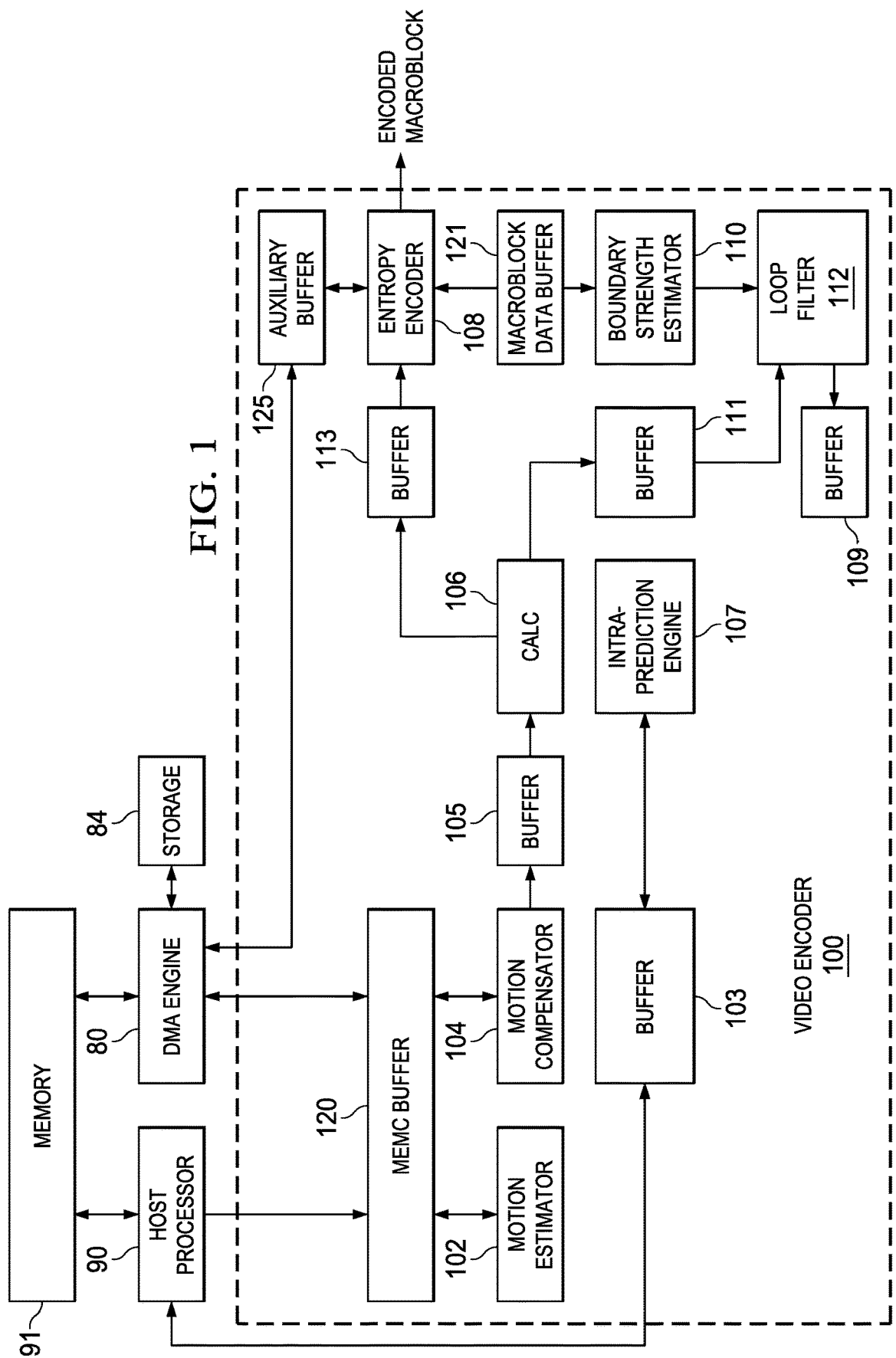
FIG. 1 shows a system including a video encoder in accordance with various embodiments.

FIG. 1 shows a block diagram of a video encoder 100 in accordance with various embodiments. The encoder 100 includes a motion estimator (ME) 102, a motion compensator (MC) 104, a calculation engine (CALC) 106, an intra-prediction engine 107, an entropy encoder 108, a boundary strength estimator 110, and a loop filter 112.

The motion estimator 102 and the motion compensator 104 cooperate to provide macroblock inter-frame predictions (i.e., temporal predictions). The motion estimator 102 searches a previous frame for a matching macroblock to each macroblock in a current frame and generates a motion vector for a given macroblock based on a closest match for the macroblock in a previously encoded frame. The ME 102 writes the motion vector at a common offset in buffer 120 agreed upon by the ME 102 and MC 104. The motion compensator 104 applies the motion vector produced by the motion estimator 102 to the previously encoded frame to generate an estimate of the given macroblock.

The intra-prediction engine 107 analyzes a given macroblock with reference to one or more adjacent macroblocks in the same frame. For example, when encoding a given macroblock, the intra-prediction engine 107 may analyze a macroblock directly above (upper macroblock), a macroblock to the right of the upper macroblock (upper right macroblock), a macroblock to the left of the upper macroblock (upper left macroblock), and a macroblock immediately to the left of the given macroblock (left macroblock) to provide spatial predictions. The intra-prediction engine 107 generates a spatial activity metric which it stores in buffer 103. Based on the analysis, the intra-prediction engine 107 selects one of a plurality of intra-prediction modes for application to the given macroblock.

In addition to the motion vector, the ME 102 generates another metric known as the Sum of Absolute Differences (SAD). The SAD is the sum of the absolute differences between pixels in a current macroblock and corresponding pixels in a reference macroblock. The host processor 90 reads the spatial activity metric generated by the intra-prediction engine 107 via buffer 103 and the SAD generated by the ME 102 and performs a mode decision. In the mode decision, the host processor 90 determines whether the current macroblock is to be encoded using either an intra-block encoding technique or an inter-block encoding technique. After making this mode decision, the host processor 90 programs the CALC engine 106 and the entropy encoder 108 to encode each macroblock in accordance with the mode decision made for the macroblock.

In accordance with at least some embodiments of the invention, the intra mode is fixed at 16×16 (one of the four 16×16 modes per the H.264 standard) so that the intra-prediction engine 107 does not have to spend cycles to decide the mode. Further, the intra-prediction engine 107 preferably is programmed to provide a measure of spatial activity of the current block which is used to compare against a SAD of the motion compensated block.

If the mode decision made by the host processor 90 is to inter-block encode a given macroblock, the CALC engine 106 reads interpolated or motion compensated luminance and chrominance values from a buffer 105 shared between the MC 104 and CALC engine 106. The CALC engine 106 is given a copy of the current macroblock (also referred as the "original" macroblock) by the host processor 90 using the DMA engine 80. The CALC engine 106 takes the difference between motion compensated pixels and current pixels to produce residuals. The residuals will be transformed, quantized, and saved to a buffer 113 shared between the CALC engine 106 and the entropy encoder 108. As quantization is a lossy process (i.e., the precision of the transformed coefficients will be lost when inverse quantization is applied), the CALC engine will produce a reconstructed set of pixels by performing inverse quantization and inverse transformation. The CALC engine 106 will then save the reconstructed pixels in a buffer 111 shared between the CALC engine 106 and the loop filer 112. The reconstructed pixels will be filtered by the loop filter 112 based on the boundary strengths provided by the boundary strength estimator 110. The loop filter 112 saves the filtered data to a buffer 109 which is accessible also by the DMA engine 80.

If the mode decision made by the host processor 90 is to intra-block encode a given macroblock, the CALC engine 106 reads the intra mode and performs intra prediction for the mode for which it has been programmed. The CALC engine 106 computes the difference between intra-predicted pixels and current pixels and produces the residuals. The residuals will be transformed, quantized, and saved into buffer 113. As noted above, quantization is a lossy process and thus the CALC engine will produce a reconstructed set of pixels by performing inverse quantization and inverse transformation. The CALC engine 106 will then save the reconstructed pixels into buffer 111. The reconstructed pixels will be filtered by the loop filter 112 based on the boundary strengths provided by the boundary strength estimator 110. The loop filter 112 saves the filtered data to buffer 109 at the end for the DMA engine 80 to store in external memory.

The entropy encoder 108 receives the transformed quantized residuals, and applies a suitable coding technique. For example, the entropy encoder 108 may apply one of context adaptive binary arithmetic coding and context adaptive variable length coding to produce an entropy encoded macroblock.

The entropy encoder 108 and the boundary strength estimator 110 share and communicate with each other by way of macroblock data buffer (MBDATBUF) 121. The entropy encoder stores a data set in the MBDATBUF 121 that defines a corresponding macroblock. The boundary strength estimator 110 reads the macroblock data set of each macroblock and assigns strength values to the edges of blocks within the macroblock. For example, the boundary strength estimator 110 may apply strength values to the edges of 4×4 or 8×8 blocks of each macroblock. The strength values may be determined based on, for example, inter-block luminance gradient, size of applied quantization step, and difference in applied coding.

The loop filter 112 receives the strength values provided from the boundary strength estimator 110 and filters the block edges in accordance with the boundary strength values. Each filtered macroblock may be stored for use by the motion estimator 102 and the motion compensator 104 in inter-prediction.

Referring still to FIG. 1, the video encoder 100 also includes a buffer 120 that is shared by the motion estimator (ME) 102 and the motion compensator (MC) 104. Because the buffer 120 is shared by ME 102 and MC 104, the buffer is referred to as an MEMC buffer 120. The MEMC buffer 120 is also shared by a DMA engine 80 and/or a host processor 90. The host processor 90 itself may write video data to the MEMC buffer 120 or program the DMA engine 80 to write video data from storage 84 to the buffer. Thus, the MEMC buffer 120 is accessible by multiple other hardware units (e.g., ME 102, MC 104, DMA engine 80, and host processor 90).

The MEMC buffer 120 preferably is operated in a "four buffer mode." Four buffer mode means the MEMC buffer 120 is accessed as four pages. Each page may comprise any desired size such as 8 Kbytes. Each page can be accessed by a different master than the other pages. Thus, the ME 102 can access one page of the MEMC buffer 120, while the MC 104 and DMA engine 80 access other pages of the buffer.

As explained above, the entropy encoder 108 generates a data set for each macroblock and stores that data set in the MBDATBUF 121 for use by the boundary strength estimator 110. The data set defines the corresponding macroblock. Table I below lists the various values that are included in an illustrated data set for a given macroblock. In the embodiment of Table I, a macroblock data set includes 304 bytes.

TABLE I

| Full Macroblock Data Set | | | |
|---|---|---|---|
| Offset | Bits | Parameter | Description |
| 0x00 | 63:56 | MB_TYPE_ID | Id number specifying type of macroblock |
| | 55:40 | mb_qp_delta | QP difference from the previous macroblock |
| | 39 | end_of_slice_flag | Flag to indicate the last macroblock in the slice |
| | 38 | mb_field_decoding_flag | Flag to indicate adaptive frame/field macroblock |
| | 37:17 | Reserved | |
| | 16 | transform_size_8 × 8_flag | Flag to indicate whether 4 × 4 transform or 8 × 8 transform was used |
| | 15:8 | MB_QP | QP Y (quantizer parameter) for the macroblock |
| | 7:6 | Reserved | |
| | 5 | cond_mb_skip_flag | Flag to indicate a skip macroblock where there are no non-zero coefficients |
| | 4 | mb_skip_flag | Flag to indicate if the macroblock will be skipped or not. |
| | 3:1 | Reserved | |
| | 0 | available | Flag to indicate if the macroblock is available as a neighbor to current macroblock. |
| 0x08 | 63:38 | Reserved | |
| | 37:36 | CodedBlockPatternChroma | Flag to indicate whether AC/DC coefficients were coded for chroma blocks |
| | 35:32 | CodedBlockPatternLuma | Flag to indicate whether AC/DC coefficients were coded for luma blocks. |
| | 31:27 | Reserved | |
| | 26:0 | CBP_27 | Bit field to indicate both luma and chroma coefficients. |
| 0x10 | 63:56 | intra_chroma_pred_mode | Intra chroma prediction mode. |
| | 55:16 | Reserved | |
| | 15:0 | PREV_INTRA_MODE_FLAGS | Previous intra mode flags corresponding to current macroblock. |
| 0x18 | 63:56 | REM_INTRA_MODE[7] | Bit fields at a 4 × 4 block level to capture the remainder intra prediction mode. |
| | 55:48 | REM_INTRA_MODE[6] | |
| | 47:40 | REM_INTRA_MODE[5] | |
| | 39:32 | REM_INTRA_MODE[4] | |
| | 31:24 | REM_INTRA_MODE[3] | |
| | 23:16 | REM_INTRA_MODE[2] | |
| | 15:8 | REM_INTRA_MODE[1] | |
| | 7:0 | REM_INTRA_MODE[0] | |
| 0x20 | 63:56 | REM_INTRA_MODE[15] | |
| | 55:48 | REM_INTRA_MODE[14] | |
| | 47:40 | REM_INTRA_MODE[13] | |
| | 39:32 | REM_INTRA_MODE[12] | |
| | 31:24 | REM_INTRA_MODE[11] | |
| | 23:16 | REM_INTRA_MODE[10] | |
| | 15:8 | REM_INTRA_MODE[9] | |
| | 7:0 | REM_INTRA_MODE[8] | |
| 0x28 | 63:32 | Reserved | |
| | 31:24 | SUB_MB_TYPE_ID[3] | Inter mb types at 8 × 8 block level. |
| | 23:16 | SUB_MB_TYPE_ID[2] | |
| | 15:8 | SUB_MB_TYPE_ID[1] | |
| | 7:0 | SUB_MB_TYPE_ID[0] | |
| 0x30 | 63:56 | REF_IDX[1][3] | List 0 and List 1 reference index at 8 × 8 level. |
| | 55:48 | REF_IDX[1][2] | |
| | 47:40 | REF_IDX[1][1] | |
| | 39:32 | REF_IDX[1][0] | |
| | 31:24 | REF_IDX[0][3] | |
| | 23:16 | REF_IDX[0][2] | |
| | 15:8 | REF_IDX[0][1] | |
| | 7:0 | REF_IDX[0][0] | |
| 0x38 | 63:32 | MV[1][0] | Motion vectors of the macroblock at 4 × 4 block level for both List 0 and List 1 reference frame as |
| | 31:0 | MV[0][0] | |
| 0x40 | 63:32 | MV[1][1] | |
| | 31:0 | MV[0][1] | |

TABLE I-continued

Full Macroblock Data Set

| Offset | Bits | Parameter | Description |
|---|---|---|---|
| 0x48 | 63:32 | MV[1][2] | indicated by REF_IDX |
|  | 31:0 | MV[0][2] |  |
| 0x50 | 63:32 | MV[1][3] |  |
|  | 31:0 | MV[0][3] |  |
| 0x58 | 63:32 | MV[1][4] |  |
|  | 31:0 | MV[0][4] |  |
| 0x60 | 63:32 | MV[1][5] |  |
|  | 31:0 | MV[0][5] |  |
| 0x68 | 63:32 | MV[1][6] |  |
|  | 31:0 | MV[0][6] |  |
| 0x70 | 63:32 | MV[1][7] |  |
|  | 31:0 | MV[0][7] |  |
| 0x78 | 63:32 | MV[1][8] |  |
|  | 31:0 | MV[0][8] |  |
| 0x80 | 63:32 | MV[1][9] |  |
|  | 31:0 | MV[0][9] |  |
| 0x88 | 63:32 | MV[1][10] |  |
|  | 31:0 | MV[0][10] |  |
| 0x90 | 63:32 | MV[1][11] |  |
|  | 31:0 | MV[0][11] |  |
| 0x98 | 63:32 | MV[1][12] |  |
|  | 31:0 | MV[0][12] |  |
| 0xA0 | 63:32 | MV[1][13] |  |
|  | 31:0 | MV[0][13] |  |
| 0xA8 | 63:32 | MV[1][14] |  |
|  | 31:0 | MV[0][14] |  |
| 0xB0 | 63:32 | MV[1][15] |  |
|  | 31:0 | MV[0][15] |  |
| 0xB8 | 63:56 | Reserved |  |
|  | 55:48 | TOTAL_COEF[14] | Total non zero coefficients of |
|  | 47:40 | TOTAL_COEF[11] | Luma block at 4 × 4 level |
|  | 39:32 | TOTAL_COEF[10] |  |
|  | 31:24 | TOTAL_COEF[15] |  |
|  | 23:16 | TOTAL_COEF[13] |  |
|  | 15:8 | TOTAL_COEF[7] |  |
|  | 7:0 | TOTAL_COEF[5] |  |
| 0xC0 | 63:56 | Reserved |  |
|  | 55:48 | TOTAL_COEF[22] | Total non zero coefficients of |
|  | 47:40 | TOTAL_COEF[23] | Cb block at 4 × 4 level. |
|  | 39:32 | TOTAL_COEF[21] |  |
|  | 31:24 | Reserved |  |
|  | 23:16 | TOTAL_COEF[18] | Total non zero coefficients of |
|  | 15:8 | TOTAL_COEF[19] | Cr block at 4 × 4 level |
|  | 7:0 | TOTAL_COEF[17] |  |
| 0xC8 | 63:0 | Reserved |  |
| 0xD0 | 63:24 | Reserved |  |
|  | 23:16 | QP_CR | QP for Cr samples |
|  | 15:8 | QP_CB | QP for Cb samples |
|  | 7:0 | QP_Y | QP for Y samples |
| 0xD8 | 63:56 | REF_PIC_ID[1][3] | Reference picture ID for all |
|  | 55:48 | REF_PIC_ID[0][3] | the 4 × 4 blocks of a |
|  | 47:40 | REF_PIC_ID[1][2] | macroblock for both List 0 |
|  | 39:32 | REF_PIC_ID[0][2] | and List 1. |
|  | 31:24 | REF_PIC_ID[1][1] |  |
|  | 23:16 | REF_PIC_ID[0][1] |  |
|  | 15:8 | REF_PIC_ID[1][0] |  |
|  | 7:0 | REF_PIC_ID[0][0] |  |
| 0xE0 | 63:56 | REF_PIC_ID[1][7] |  |
|  | 55:48 | REF_PIC_ID[0][7] |  |
|  | 47:40 | REF_PIC_ID[1][6] |  |
|  | 39:32 | REF_PIC_ID[0][6] |  |
|  | 31:24 | REF_PIC_ID[1][5] |  |
|  | 23:16 | REF_PIC_ID[0][5] |  |
|  | 15:8 | REF_PIC_ID[1][4] |  |
|  | 7:0 | REF_PIC_ID[0][4] |  |
| 0xE8 | 63:56 | REF_PIC_ID[1][11] |  |
|  | 55:48 | REF_PIC_ID[0][11] |  |
|  | 47:40 | REF_PIC_ID[1][10] |  |
|  | 39:32 | REF_PIC_ID[0][10] |  |
|  | 31:24 | REF_PIC_ID[1][9] |  |
|  | 23:16 | REF_PIC_ID[0][9] |  |
|  | 15:8 | REF_PIC_ID[1][8] |  |
|  | 7:0 | REF_PIC_ID[0][8] |  |
| 0xF0 | 63:56 | REF_PIC_ID[1][15] |  |
|  | 55:48 | REF_PIC_ID[0][15] |  |
|  | 47:40 | REF_PIC_ID[1][14] |  |

TABLE I-continued

Full Macroblock Data Set

| Offset | Bits | Parameter | Description |
|---|---|---|---|
|  | 39:32 | REF_PIC_ID[0][14] |  |
|  | 31:24 | REF_PIC_ID[1][13] |  |
|  | 23:16 | REF_PIC_ID[0][13] |  |
|  | 15:8 | REF_PIC_ID[1][12] |  |
|  | 7:0 | REF_PIC_ID[0][12] |  |
| 0xF8 | 63:32 | MVD[1][5] | The motion vector difference |
|  | 31:0 | MVD[0][5] | at 4 × 4 level of the |
| 0x100 | 63:32 | MVD[1][7] | neighboring macroblocks. |
|  | 31:0 | MVD[0][7] |  |
| 0x108 | 63:32 | MVD[1][13] |  |
|  | 31:0 | MVD[0][13] |  |
| 0x110 | 63:32 | MVD[1][15] |  |
|  | 31:0 | MVD[0][15] |  |
| 0x118 | 63:32 | MVD[1][10] |  |
|  | 31:0 | MVD[0][10] |  |
| 0x120 | 63:32 | MVD[1][11] |  |
|  | 31:0 | MVD[0][11] |  |
| 0x128 | 63:32 | MVD[1][14] |  |
|  | 31:0 | MVD[0][14] |  |

Macroblock data sets are also used to encode other macroblocks. For example, the entropy encoder 108 may encode a given macroblock using information about a macroblock directly above (upper macroblock), a macroblock to the right of the upper macroblock (upper right macroblock), a macroblock to the left of the upper macroblock (upper left macroblock), and a macroblock immediately to the left of the given macroblock (left macroblock). However, not all of the parameters in a macroblock data set are needed for the purpose of encoding other macroblocks.

Table II below shows one example of just the parameters from Table I that may be needed by the entropy encoder 108 to encode other macroblocks. This information is referred to as compressed macroblock information. The number of bytes of data in compressed macroblock information in the example of Table II is 128 bytes.

TABLE II

Compressed Macroblock Information

| Offset | Bits | Parameter | Description |
|---|---|---|---|
| 0x00 | 63:56 | MB_TYPE_ID | Id number specifying type of macroblock |
|  | 55:40 | mb_qp_delta | QP difference from the previous macroblock |
|  | 39 | end_of slice_flag | Flag to indicate the last macroblock in the slice |
|  | 38 | mb_field_decoding_flag | Flag to indicate adaptive frame/field macroblock |
|  | 37:17 | Reserved |  |
|  | 16 | transform_size_8 × 8_flag | Flag to indicate whether 4 × 4 transform or 8 × 8 transform was used |
|  | 15:8 | MB_QP | QP Y (quantizer parameter) for the macroblock |
|  | 7:6 | Reserved |  |
|  | 5 | cond_mb_skip_flag | Flag to indicate a skip macroblock where there are no non-zero coefficients |
|  | 4 | mb_skip_flag | Flag to indicate if the macroblock will be skipped or not. |
|  | 3:1 | Reserved |  |
|  | 0 | available | Flag to indicate if the macroblock is available as a neighbor to current macroblock. |
| 0x08 | 63:38 | Reserved |  |
|  | 37:36 | CodedBlockPatternChroma | Flag to indicate whether AC/DC coefficients were coded for chroma blocks |
|  | 35:32 | CodedBlockPatternLuma | Flag to indicate whether AC/DC coefficients were coded for luma blocks. |
|  | 31:27 | Reserved |  |
|  | 26:0 | CBP_27 | Bit field to indicate both luma and chroma coefficients. |

TABLE II-continued

Compressed Macroblock Information

| Offset | Bits | Parameter | Description |
|---|---|---|---|
| 0x10 | 63:56 | intra_chroma_pred_mode | Intra chroma prediction mode. |
|  | 55:16 | Reserved |  |
|  | 15:0 | PREV_INTRA_MODE_FLAGS | Previous intra mode flags corresponding to current macroblock. |
| 0x30 | 63:56 | REF_IDX[1][3] | List 0 and List 1 reference index at 8 × 8 level. |
|  | 55:48 | REF_IDX[1][2] |  |
|  | 47:40 | REF_IDX[1][1] |  |
|  | 39:32 | REF_IDX[1][0] |  |
|  | 31:24 | REF_IDX[0][3] |  |
|  | 23:16 | REF_IDX[0][2] |  |
|  | 15:8 | REF_IDX[0][1] |  |
|  | 7:0 | REF_IDX[0][0] |  |
| 0x88 | 63:32 | MV[1][10] | Motion vectors |
|  | 31:0 | MV[0][10] |  |
| 0x90 | 63:32 | MV[1][11] |  |
|  | 31:0 | MV[0][11] |  |
| 0xA8 | 63:32 | MV[1][14] |  |
|  | 31:0 | MV[0][14] |  |
| 0xB0 | 63:32 | MV[1][15] |  |
|  | 31:0 | MV[0][15] |  |
| 0xB8 | 63:56 | Reserved |  |
|  | 55:48 | TOTAL_COEF[14] | Total non zero coefficients of Luma block at 4 × 4 level |
|  | 47:40 | TOTAL_COEF[11] |  |
|  | 39:32 | TOTAL_COEF[10] |  |
|  | 31:24 | TOTAL_COEF[15] |  |
|  | 23:16 | TOTAL_COEF[13] |  |
|  | 15:8 | TOTAL_COEF[7] |  |
|  | 7:0 | TOTAL_COEF[5] |  |
| 0xC0 | 63:56 | Reserved |  |
|  | 55:48 | TOTAL_COEF[22] | Total non zero coefficients of Cb block at 4 × 4 level. |
|  | 47:40 | TOTAL_COEF[23] |  |
|  | 39:32 | TOTAL_COEF[21] |  |
|  | 31:24 | Reserved |  |
|  | 23:16 | TOTAL_COEF[18] | Total non zero coefficients of Cr block at 4 × 4 level |
|  | 15:8 | TOTAL_COEF[19] |  |
|  | 7:0 | TOTAL_COEF[17] |  |
| 0xE8 | 63:56 | REF_PIC_ID[1][11] | Reference picture ID |
|  | 55:48 | REF_PIC_ID[0][11] |  |
|  | 47:40 | REF_PIC_ID[1][10] |  |
|  | 39:32 | REF_PIC_ID[0][10] |  |
|  | 31:24 | REF_PIC_ID[1][9] |  |
|  | 23:16 | REF_PIC_ID[0][9] |  |
|  | 15:8 | REF_PIC_ID[1][8] |  |
|  | 7:0 | REF_PIC_ID[0][8] |  |
| 0xF0 | 63:56 | REF_PIC_ID[1][15] |  |
|  | 55:48 | REF_PIC_ID[0][15] |  |
|  | 47:40 | REF_PIC_ID[1][14] |  |
|  | 39:32 | REF_PIC_ID[0][14] |  |
| 0x110 | 63:32 | MVD[1][15] | Motion vector differences |
|  | 31:0 | MVD[0][15] |  |
| 0x118 | 63:32 | MVD[1][10] |  |
|  | 31:0 | MVD[0][10] |  |
| 0x120 | 63:32 | MVD[1][11] |  |
|  | 31:0 | MVD[0][11] |  |
| 0x128 | 63:32 | MVD[1][14] |  |
|  | 31:0 | MVD[0][14] |  |

The video encoder of FIG. 1 also includes an auxiliary buffer (AUX BFR) 125 accessible to the entropy encoder 108 and the DMA engine 80. The entropy encoder 108 preferably copies just the parameters from the full macroblock data set to the AUX BFR 125 that are needed to encode other macroblocks. Thus, the MBDATBUF 121 stores the full macroblock data set, while the AUX BFR 125 stores the compressed macroblock information. The entropy encoder 108 copies the needed portions of the macroblock data set from MBDATBUF 121 by reading those portions and then writing them to AUX BFR 125.

The DMA engine 80 has access to the compressed macroblock information in AUX BFR 125 and then preferably writes the compressed macroblock information to memory 91. Memory 91 preferably is data memory accessible to the host processor 90. In some embodiments, memory 91 is internal to the host processor 90, but may be external to the host processor in other embodiments. The DMA engine 80 writes the compressed macroblock information content from AUX BFR 125 to memory 91 for subsequent use by the entropy encoder 108 in encoding other macroblocks.

Figure 2:
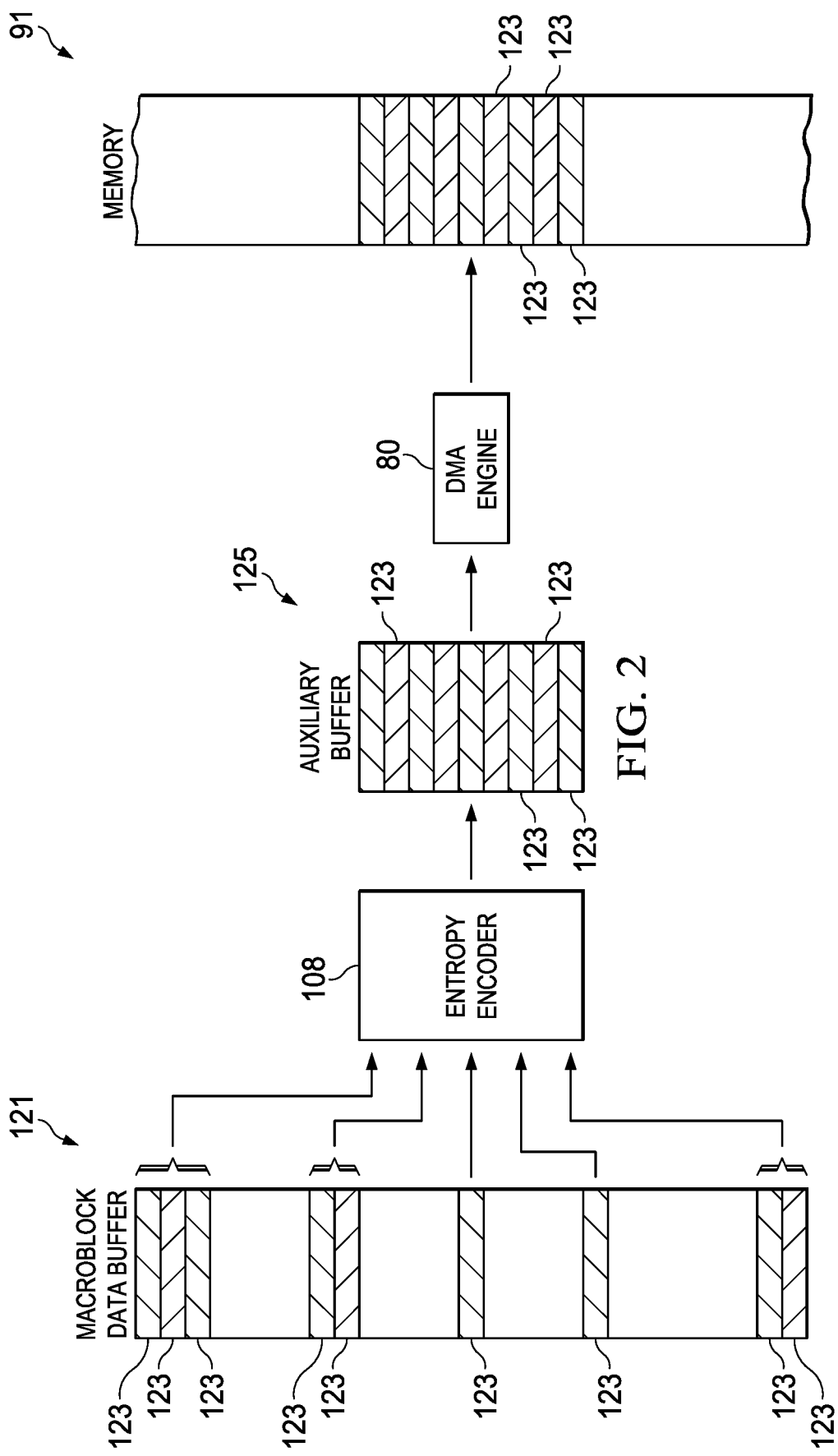
FIG. 2 illustrates a process by which a macroblock data set is compressed for subsequent use in encoding another macroblock.

FIG. 2 depicts the multi-step process by which the macroblock data set is compressed and saved to external memory 91. The full macroblock data set is stored in memory 91. The portions 123 that are needed to encode other macroblocks are illustrated in cross-hatching. As illustrated, the various portions 123 needed to encode other macroblocks are stored in MBDATBUF 121 in a non-contiguous fashion. The entropy encoder 108 copies those particular portions 123 to the AUX BFR 125 in contiguous storage locations. The DMA engine 80 then copies the entire compressed macroblock information from AUX BFR 125 to another set of contiguous storage locations in memory 91. The DMA engine 80 may write the previously saved compressed macroblock information from memory 91 back to the AUX BFR 125 for use by the entropy encoder.

Figure 3:
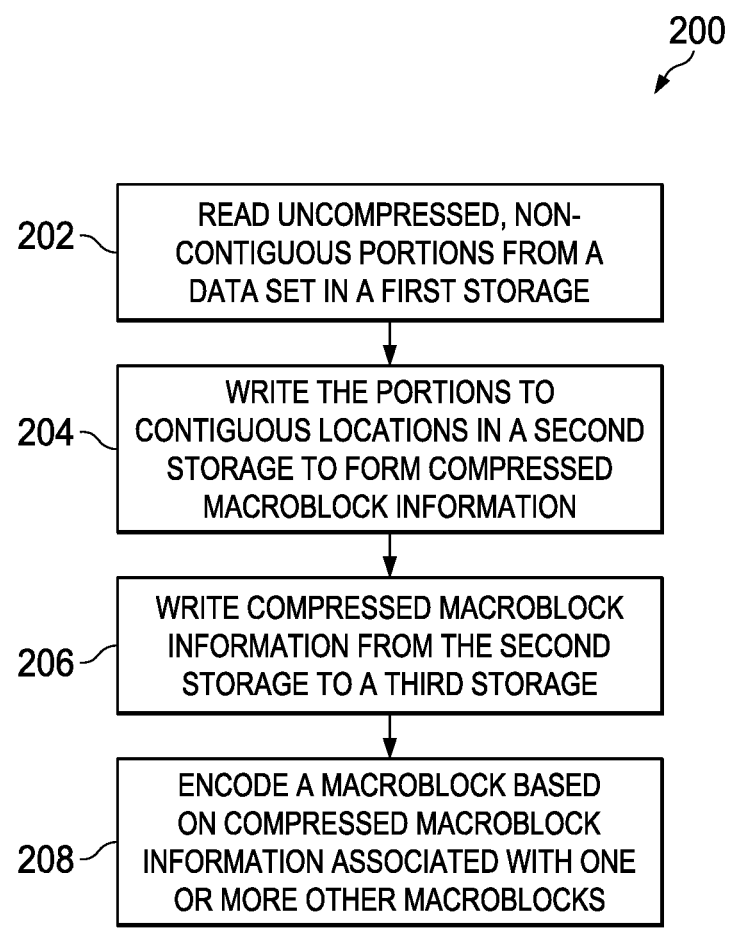
FIG. 3 shows a method in accordance with various embodiments.

FIG. 3 illustrates a corresponding method 200. The various actions shown in FIG. 3 can be performed in the order shown or in a different order and two or more of the actions may be performed in parallel, rather than sequentially.

At 202, the method comprises the entropy encoder 108 reading uncompressed, non-contiguous portions from a data set in a first storage. The first storage may be the MDDAT-BUF 121. The data set preferably describes a macroblock. Further, the portions that are read at 202 preferably are some, but not all, of the data set.

At 204, method 200 includes the entropy encoder 108 writing the portions read at 202 to contiguous locations in a second storage to form compressed macroblock information. The second storage may be the AUX BFR 125.

At 206, the method comprises the DMA engine 80 writing the compressed macroblock information from the second storage (e.g., the AUX BFR 125) to a third storage. The third storage may be memory 91.

Finally, at 208, the method preferably comprises the entropy encoder encoding another macroblock based on the compressed macroblock information from memory 91 that was associated a different macroblock. That is, the compressed macroblock information pertains to a first macroblock and is used to compress a second macroblock.

In some embodiments, the compressed macroblock information used to encode a given macroblock represents one or more macroblocks that surround the given macroblock being encoded. For example, the surrounding macroblocks may be the left, upper, upper-left, and/or upper-right macroblocks.

By compressing the macroblock data set and saving the compressed macroblock information in external memory, a more efficient macroblock transfer process is possible.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A video encoder comprising:
a memory configured to store a first set of data that corresponds to a first macroblock of a video frame;
an entropy encoder coupled to the memory; and
a buffer coupled to the entropy encoder, wherein the entropy encoder is configured to:
determine which data from a first set of data are not needed for encoding a second macroblock, and to identify all data from the first set of data, other than the data not needed for encoding a second macroblock, as a second set of data;
retrieve the second set of data from the memory;
cause the second set of data to be stored in the buffer; and
encode the second macroblock using the second set of data.

2. The video encoder of claim 1, wherein the second macroblock is another macroblock in the video frame.

3. The video encoder of claim 1, wherein the first macroblock is one of: a left macroblock with respect to the second macroblock;
an upper-left macroblock with respect to the second macroblock; an upper macroblock with respect to the second macroblock; or an upper-right macroblock with respect to the second macroblock.

4. The video encoder of claim 1, wherein the first set of data is stored in contiguous storage locations in the memory, wherein the data of the second set correspond to only a portion of the first set of data and includes data stored in a first portion of the contiguous storage location and a second portion of the contiguous storage locations, the first and second portions of the contiguous storage locations being non-contiguous.

5. The video encoder of claim 1, wherein the entropy encoder is further configured to cause the second set of data to be stored in contiguous storage locations in the buffer.

6. The video encoder of claim 1, wherein the first and second macroblocks each have a size of 16×16 pixels.

7. The video encoder of claim 1, wherein the first data is a motion vector of the first macroblock and the second property is a property other than a motion vector of the first macroblock.

8. The video encoder of claim 7, wherein the second data is one of luma and chroma information of the first macroblock.

9. The video encoder of claim 1 further comprising a direct memory access engine coupled between the memory and the entropy encoder and configured to:
retrieve the second set of data from the memory in response to the entropy encoder;
receive the second set of data from the buffer; and
cause the second set of data to be stored in the memory.

10. The video encoder of claim 9, wherein the direct memory access engine is configured to cause the second set of data to be stored to a set of contiguous locations in the memory.

11. The video encoder of claim 1, wherein the memory is configured to store the first set of data that includes the second set of data stored in a set of non-contiguous memory locations and a copy of the second set of data stored in a set of contiguous memory locations.

12. An electronic system comprising:
a memory configured to store a first set of data that corresponds to a first macroblock of a video frame, wherein the first set of data defines the first macroblock;
an encoder coupled to the memory by a memory interface, wherein the encoder includes:
a buffer; and
an entropy encoder coupled to the buffer and configured to:
determine which data from the first set of data are not needed for encoding the second macroblock, and to identify all data from the first set of data, other than the data not needed for encoding the second macroblock, as the second set of data;
receive, from the memory, a second set of data that is a subset of the first set of data and includes at least a first data and a second data with the first and second properties being different types of data;
cause the second set of data to be stored in the buffer; and encode a second macroblock using the second set of data.

13. The electronic system of claim 12, wherein the second macroblock is another macroblock in the video frame.

14. The electronic system of claim 12, wherein the first macroblock is one of: a left macroblock with respect to the second macroblock;
an upper-left macroblock with respect to the second macroblock; an upper macroblock with respect to the second macroblock; or an upper-right macroblock with respect to the second macroblock.

15. The electronic system of claim 12, wherein:
the first set of data is stored in contiguous storage locations in the first memory;
the data of the second set correspond to only a portion of the first set of data and includes data stored in a first portion of the contiguous storage locations and a second portion of the contiguous storage locations; and
the first and second portions of the contiguous storage locations are non-contiguous with respect to each other.

16. The electronic system of claim 15, wherein the memory interface is a direct memory access (DMA) interface and is configured to transfer the second set of data from the buffer to the memory.

17. The electronic system of claim 12, wherein the entropy encoder further is configured to determine which data from the first set of data are not needed for encoding the second macroblock, to identify all remaining data from the first set of data other than the data not needed for encoding the second macroblock as the second set of data, and to selectively retrieve the second set of data from the memory.

18. The electronic system of claim 17, wherein the entropy encoder is further configured to cause the second set of data to be stored in contiguous storage locations in the memory.

19. The electronic system of claim 12, wherein the first data is a motion vector of the first macroblock and the second data is a property other than a motion vector of the first macroblock.

* * * * *